United States Patent [19]

Murata et al.

[11] Patent Number: 5,343,338
[45] Date of Patent: Aug. 30, 1994

[54] TAPE DRIVE APPARATUS

[75] Inventors: Shigeki Murata, Nara; Haruo Isaka, Kyoto; Kenji Matsuura, Nara; Yasushi Sogabe, Osaka, all of Japan

[73] Assignee: Matsushita Electric Industrial Co., Ltd., Osaka, Japan

[21] Appl. No.: 858,004

[22] Filed: Mar. 26, 1992

[30] Foreign Application Priority Data

Apr. 16, 1991 [JP] Japan ................... 3-083816

[51] Int. Cl.$^5$ ............... G11B 15/18; G11B 17/00
[52] U.S. Cl. ............................. 360/69; 360/71; 360/75
[58] Field of Search ................. 360/69, 71, 75

[56] References Cited

U.S. PATENT DOCUMENTS

| 4,965,683 | 10/1990 | Otani | 360/71 |
| 5,206,771 | 4/1993 | Katou et al. | 360/71 |

FOREIGN PATENT DOCUMENTS

| 0312402 | 4/1989 | European Pat. Off. | |
| 0189367 | 11/1982 | Japan . | |
| 0064601 | 3/1988 | Japan | 360/69 |
| 1110460 | 4/1989 | Japan . | |
| 1303663 | 12/1989 | Japan . | |
| 2126413 | 5/1990 | Japan . | |
| 3125357 | 5/1991 | Japan . | |

OTHER PUBLICATIONS

"A Study of the Behavior of Tape Running along the Rotating Drum" by D. Kato et al., Spring Meeting of Japanese Society of Electronics and Information Communication, pp. 5–55.

*Primary Examiner*—Edward K. Look
*Assistant Examiner*—Christopher Verdier
*Attorney, Agent, or Firm*—Pollock, Vande Sande & Priddy

[57] ABSTRACT

The present invention purports to provide a tape recording/reproducing apparatus capable of causing a plurality of tapes having different width respectively to travel smoothly and its cassette. The cassette positioning spring 1 gives an appropriate pressing force even in the case that the cassettes have different thicknesses, and the cassettes are respectively fixed at predetermined positions so that the lower edges of the magnetic tape 3a, 3b are positioned at the same height. The flange 9 of the guide post 12 is shifted in an up-and-down direction in response to a magnetic tape width signal detected through the cassette detecting switch 13 or the beginning edge detector 14a, or the ending edge detector 14b, so that even narrow magnetic tape 3a can travel at the predetermined height. Furthermore, by changing the inclined angle and/or the inclined direction of the movable post 10, a downward torsion force is applied to the narrow magnetic tape 3a. In this fashion, magnetic heads to be used are selected in accordance with the magnetic tape width detected by the cassette detecting switch 13 or the beginning edge and the ending edge detectors 14a, 14b.

8 Claims, 4 Drawing Sheets

PRIOR ART

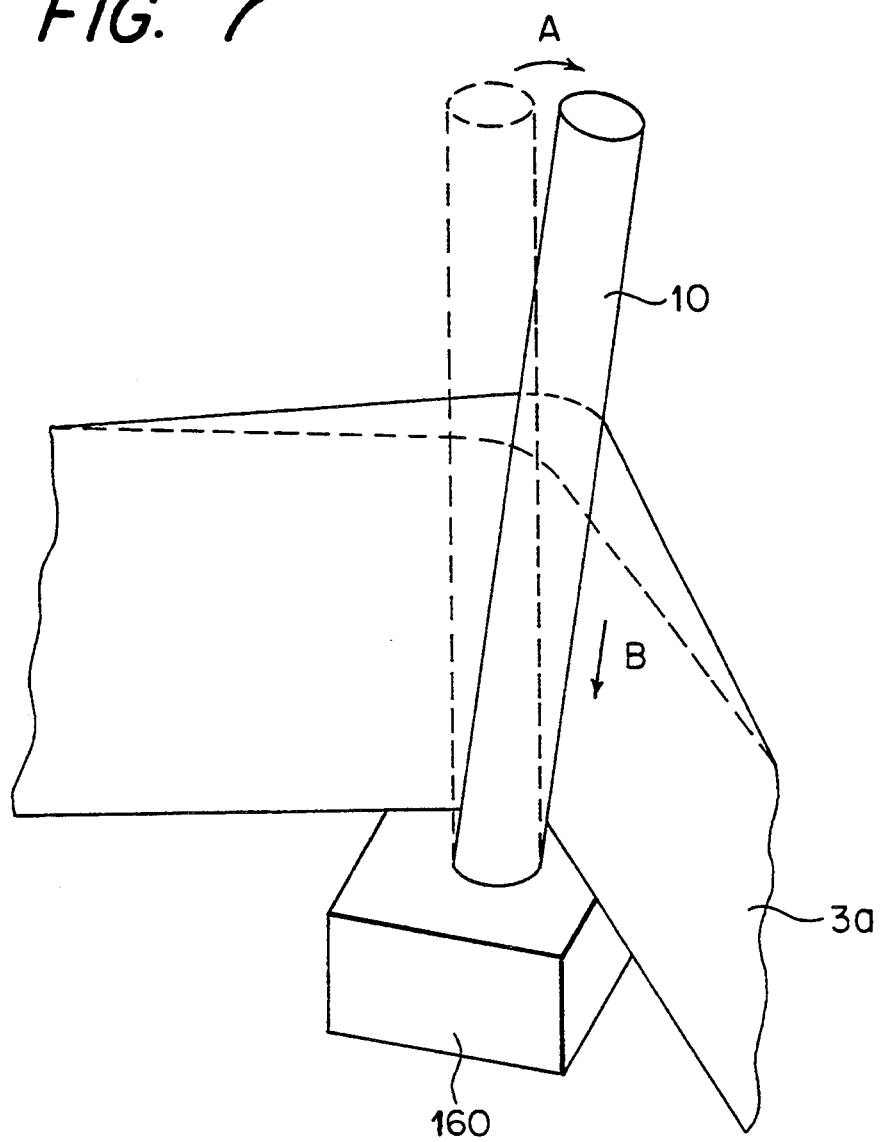

TAPE DRIVE APPARATUS

BACKGROUND OF THE INVENTION

1. Field of the Invention

The present invention relates to a tape recording/reproducing apparatus capable of causing different tapes each having a different tape width to travel smoothly in the same recording/reproducing apparatus.

2. Description of the Prior Art

Hereinafter, referring to the drawings, one example of a conventional magnetic tape recording/reproducing apparatus is explained. FIG. 5 is a perspective view showing a conventional magnetic tape recording/reproducing apparatus.

A cassette positioning spring 1 is a positioning spring for positioning and urging a cassette 2 at a predetermined position. The cassette 2 accommodates a magnetic tape 3 therein. A reference numeral 4 denotes a capstan, and a reference numeral 8 denotes a pinch roller. The magnetic tape 3 travels at a constant speed, being sandwiched by the capstan 4 and the pinch roller 8 and driven by a rotational force of the capstan 4. A reference numeral 5 denotes a magnetic head, and a reference numeral 6 denotes a guide drum. The guide drum 6 has an outer peripheral portion installed with a rotary magnetic head 5. There is provided a lead 16 to which the magnetic tape 3 is wound obliquely. The lead 16 supports a lower part of the magnetic tape 3 and guides the magnetic tape 3 to travel at a constant speed.

Reference numerals 90, 100 denote guide posts, which pull out the magnetic tape 3 from the cassette 2 and wind it around the guide drum 6. Further, reference numerals 91, 101 denote flanges provided on the guide posts 90, 100, respectively, and these flanges restrict an upper limit of the magnetic tape 3. Reference numerals 20, 21 denote inclined posts. These inclined posts 20, 21 are positioned so as to incline with respect to the magnetic tape 3 obliquely wound around the guide drum 6. A reference numeral 130 denotes a cassette detecting switch that detects whether or not a cassette exists. In other words, the cassette detecting switch 130 detects whether or not the cassette is loaded in a predetermined position. A reference numeral 140a denotes a beginning edge detector that detects a beginning edge of the magnetic tape, and a reference numeral 140b denotes an ending edge detector that detects an ending edge of the magnetic tape.

Hereinafter, an operation of the magnetic tape recording/reproducing apparatus constituted as described above is explained.

When the cassette 2 is loaded in the predetermined position and urged by the positioning spring 1, the cassette detecting switch generates a signal representing an existence of the cassette. In response to this signal, the guide posts 90, 100 and inclined posts 20, 21 pull out the magnetic tape 3 from an inside of the cassette 2 to wind it around the guide drum 6, and regulates an angle of the wound magnetic tape 3 with respect to the guide drum 6. The magnetic tape 3 travels at a constance speed by being sandwiched by the capstan 4 and the pinch roller 8 and driven by the rotational force of the capstan 4. The beginning edge detector 140a and the ending edge detector 140b detect the beginning edge and the ending edge of the magnetic tape 3 based on a transmitted quantity of light emitted from light emitting element (not shown) inserted and fixed in the cassette 2.

Furthermore, the magnetic head 5 records a signal by scanning the magnetic tape 3 and magnetizing it. FIG. 6 is a view showing a recording condition of the signal recorded in the magnetic tape 3. Recording regions are recorded in an inclined condition (i.e. inclined lines) with respect to a longitudinal direction of the magnetic tape 3. Each one of these inclined lines of the recording regions is track 22.

However, in such a conventional constitution described above, it was not possible to selectively drive the magnetic tapes having different tape widths. That is, as shown in FIG. 5, such a construction results in that only the same width magnetic tape can be allowed to travel because the magnetic tape is restricted to its upper and lower positions by the flanges 91, 101 and the lead 16. Accordingly, it was not possible to use another type tape whose width is different from a predetermined one, thus there was a problem in that users are enforced to change a VGR based on a cassette to be used.

Recently, VCRs have become remarkably popular, and their styles of usage are variously changing. For example, an outdoor usage represented by a movie type VCR or a soft reproducing an absent recording chiefly represented by a stationary type VCR have been easily enjoyed at home. There are various requirements for these VCRs. On one hand size reduction is required for cassette tapes of the movie type VCR and, on the other hand, expansion of capacity and diversification of function are sought for cassette tapes of the stationary type VCR.

That is, it is preferable for the movie type VCR to use a small cassette accommodating a narrow width magnetic tape. To the contrary, it is desired for the stationary type VCR to use a large cassette accommodating a wide width magnetic tape to obtain a tape area as wider as possible, and hopefully, to enable not only a small cassette but a large cassette to record and/or reproduce.

SUMMARY OF THE INVENTION

The present invention has a purpose, in view of above problems, to provide a tape recording/reproducing apparatus capable of causing different tapes each having a different tape width to travel smoothly in the same tape recording/reproducing apparatus, and to provide its cassette.

In order to resolve above problems encountered in the prior art, a tape recording/reproducing apparatus in accordance with the present invention uses a plurality of cassettes respectively having a different tape width, and comprises a cassette positioning means for selectively positioning a cassette on the basis of the tape width.

Further, a tape recording/reproducing apparatus in accordance with the present invention uses a plurality of cassettes respectively having a different tape width, and comprises a tape positioning means for selectively positioning a tape travelling position on the basis of the tape width.

Moreover, a tape recording/reproducing apparatus in accordance with the present invention uses a plurality of cassettes respectively having a different tape width, and comprises a cassette type detecting means for detecting a kind of cassette and a cassette positioning means for selectively positioning a cassette in response to an output of the cassette type detecting means.

Or, a tape recording/reproducing apparatus in accordance with the present invention uses a plurality of cassettes respectively having a different tape width, and comprises a cassette type detecting means for detecting a kind of cassette and a tape positioning means for selectively positioning a tape travelling position in response to an output of the cassette type detecting means.

Moreover, a tape recording/reproducing apparatus in accordance with the present invention uses tapes each having a different tape width, and comprises a tape positioning means for positioning a tape travelling height on the basis of a tape edge of the respective width tape.

Yet further, a tape recording/reproducing apparatus in accordance with the present invention uses tapes each having a different tape width, and comprises a tape width detecting means, a head for recording signals to or reproducing signals from the tape, and a recording-/reproducing section changing means for changing a section to be recorded and/or reproduced of the tape in response to an output of the tape width detecting means.

Still further, a tape recording/reproducing apparatus in accordance with the present invention includes a plurality of rotary heads installed on at least one guide drum round which the tape is obliquely wound, and the recording/reproducing section changing means selecting a head to record and/or reproduce in response to an output of the tape width detecting means.

Moreover, a tape recording/reproducing apparatus in accordance with the present invention includes a plurality of rotary heads accommodated in said guide drum and having different heights protruding from the upper surface of said guide drum, and the recording/reproducing section changing means selecting a head to record and/or reproduce in response to an output of the tape width detecting means.

Furthermore, a tape recording/reproducing apparatus in accordance with the present invention includes a rotary head accommodated in a guide drum round which the tape is wound, and the recording/reproducing section changing means changing an operation section of the head to be recorded and/or reproduced on the basis of an output of the tape width detecting means.

Or, a tape recording/reproducing apparatus in accordance with the present invention uses tapes each having a different tape width, and comprises at least one head for scanning the maximum effective recording width of the tapes each having effective recording width.

Still further, in order to resolve above problems encountered in the prior art, a cassette for the tape recording/reproducing apparatus in accordance with the present invention is a plurality of cassettes accommodating different tapes each having a different tape width, and the cassettes respectively have the same upper or lower tape height measured from a standard surface defining cassette height.

In accordance with the above arrangements of the present invention, it becomes possible to carry out the recording/reproducing operations allowing usage of different kinds of tapes with mutually different widths, thereby realizing a recording/reproducing apparatus capable of reducing size and/or increasing capacity and further suiting for multi-functional tendency.

Moreover, it becomes possible to provide a cassette which enables it easy to adequately position different width tapes, by equalizing the height from the standard surface defining a cassette height to an upper or a lower edge of a tape.

The above and other objects, features and advantages of the present invention will become more apparent from the following detailed description which is to be read in conjunction with the accompanying drawings.

DETAILED DESCRIPTION OF THE PREFERRED EMBODIMENT

Hereinafter, referring now to the accompanying drawings, the magnetic tape recording/reproducing apparatus and its cassette in accordance with preferred embodiments of the present invention are explained in detail.

First embodiment

Figure 1:
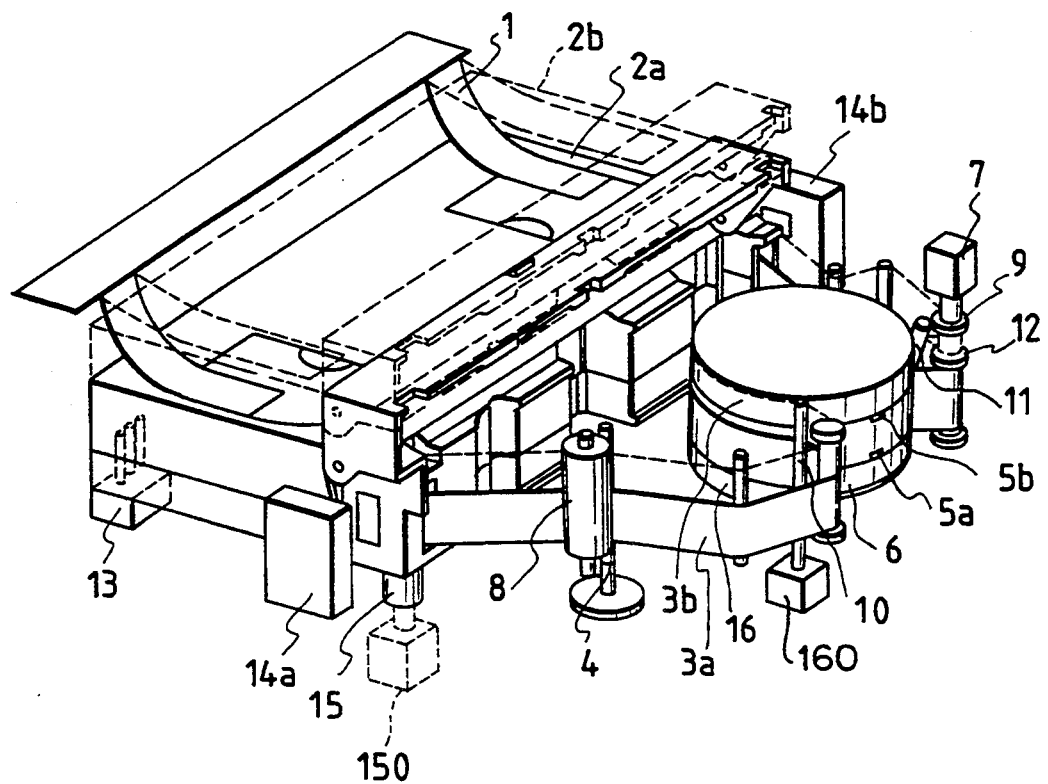
FIG. 1 is a perspective view showing the magnetic tape recording/reproducing apparatus in accordance with the first embodiment of the present invention.
Figure 5:
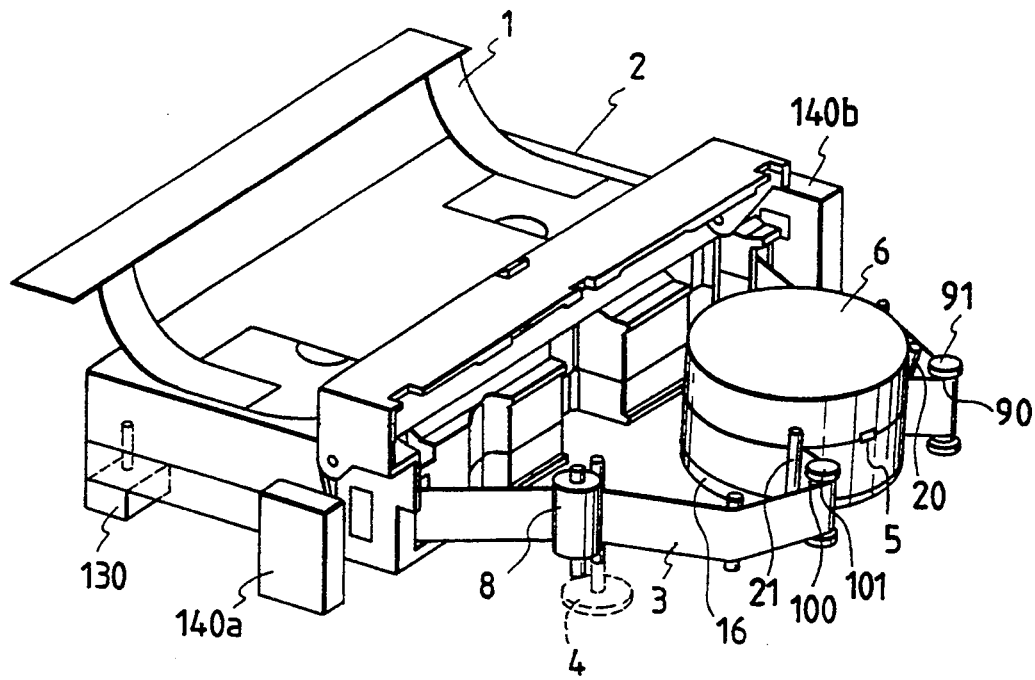
FIG. 5 is a perspective view showing the conventional magnetic tape recording/reproducing apparatus; and, FIG. 6 is a diagram showing the recording condition of signals recorded in the conventional magnetic tape recording/reproducing apparatus.
Figure 6:
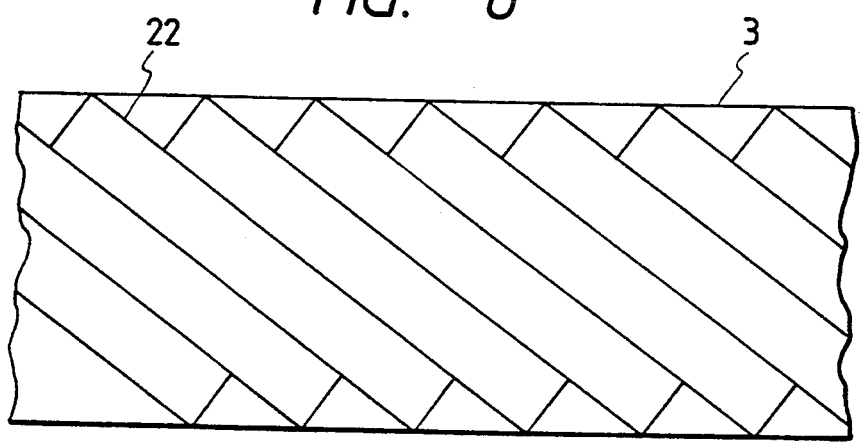

FIG. 1 is a perspective view showing the magnetic tape recording/reproducing apparatus in accordance with a first embodiment of the present invention. The same components as the conventional ones, shown in FIGS. 5 or 6 and are not directly relevant with the present invention, are omitted their explanations here.

Reference numerals 2a, 2b denote cassettes having mutually different thicknesses. Reference numerals 3a, 3b denote magnetic tapes having mutually different widths and accommodated in the cassettes 2a, 2b, respectively. A reference numeral 1 denotes a cassette positioning spring, which functions to position above different thickness cassettes 2a, 2b with respect to a cassette positioning boss 15 so as to positioning them at predetermined positions, respectively. A reference numeral 13 denotes a cassette detecting switch, which discriminates a recognition hole (not shown) for recognizing the thickness of the cassette 2a or 2b and/or the width of the magnetic tape accommodated therein as well as detection of existence of the cassette.

A reference numeral 6 denotes a guide drum, and reference numerals 5a, 5b denote magnetic heads disposed on the guide drum 6 so as to be positioned at different heights with each other. By rotating this magnetic head, regions divided in a widthwise direction of the magnetic tape can be scanned. Further, these magnetic heads 5a, 5b can be any one of a recording only type magnetic head, a reproducing only type magnetic head, or a compatible type magnetic head compatible for both recording and reproducing, and also can be an erasing magnetic head. Reference numerals 11, 12 are guide posts, which pull out the magnetic tape 3a or 3b from the cassette 2a or 2b and wind it around the guide drum 6. That is, the magnetic tape 3a or 3b is obliquely wound at a predetermined angle section of the outer peripheral surface of the guide drum 6 so that the rotating magnetic head 5a or 5b can be brought into contact with the magnetic tape 3a and 3b to record or reproduce signals.

A reference numeral 4 denotes a capstan, and a reference numeral 8 denotes a pinch roller. The magnetic tape 3a or 3b travels at a constant speed by being sandwiched by the capstan 4 and the pinch roller 8 and driven by a rotational force of the capstan 4. Further, a reference numeral 9 denotes a flange provided on the guide post 12 so as to be shiftable in an axial direction of the guide post 12. This flange functions to restrict a travelling position of each magnetic tape by abutting an edge of the magnetic tape.

A reference numeral 7 denotes an actuator that causes the flange 9 to shift. A reference numeral 14a denotes a beginning edge detector that detects a beginning edge of the magnetic tape, and a reference numeral 14b denotes an ending edge detector that detects an ending edge of the magnetic tape. A reference numeral 10 denotes a movable post varying its inclined angle and inclined direction based on the tape width.

Hereinafter, an operation of the magnetic tape recording/reproducing apparatus constituted as described above is explained.

In the case that the thick cassette 2b is used, when the cassette 2b is fixed to a predetermined position under an appropriate torsion force given by the cassette positioning spring 1, the cassette detecting switch 13 detects the recognition hole and generates a signal that varies on the basis of the cassette thickness and/or the magnetic tape width accommodated therein. In this embodiment, the cassette detecting switch 13 has a plurality of (for example, three) detecting rods. And, each cassette has one or more recognition holes at different places so that these plurality of detecting rods can recognize a kind of cassette; i.e. thickness and/or tape width.

The magnetic tape 3b is pulled out from the cassette 2b, and is returned via the guide posts 11, 12, the guide drum 6, the inclined movable post 10, and the pinch roller 8.

The beginning edge detector 14a and the ending edge detector 14b detect the beginning and the ending edges and the width of the magnetic tape on the basis of a transmitted quantity of light emitted from light emitting element (not shown) inserted and fixed in the cassette 2a, 2b. For example, the detecting current would be 5 mA at a transparent magnetic tape portion corresponding to the beginning and the ending edges of the magnetic tape, 3 mA in case of narrow magnetic tape 3a, and 0.5 mA in case of wide magnetic tape 3b., Therefore the beginning and the ending edges and the width of the magnetic tape can be easily discriminated.

Figure 2:
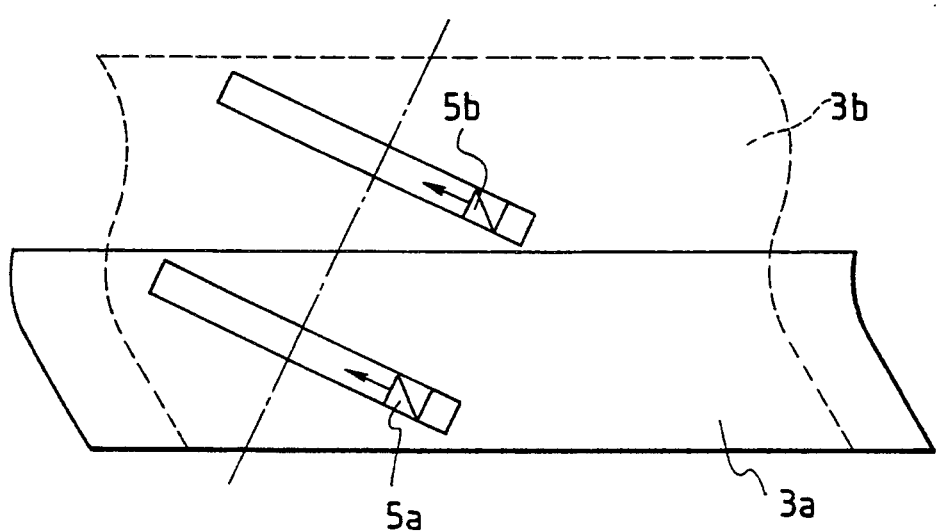
FIG. 2 is a diagram showing a scanning trace line of the magnetic head in the first embodiment of the present invention.

On the guide drum 6, there is provided the magnetic head 5a at a position where the magnetic head 5a can scan an effective recording width of the narrow magnetic tape. And also, there is provided the magnetic head 5b at a position where the magnetic head 5b can scan a region of the wide magnetic tape 3b that the magnetic head 5a cannot scan. In the case the wide magnetic tape 3b travels, both of the magnetic heads 5a, 5b perform the recording/reproducing operations, and record or reproduce signals on upper and lower portions in the widthwise direction of the magnetic tape as shown in FIG. 2.

Next, explained is the case that the thin cassette 2a is loaded. The cassette positioning spring 1 can apply an adequate pressing force by selecting its length even in the case that the thickness of the cassette is thin. Therefore, it is possible to fix the cassettes in such a manner that the lower edges of respective magnetic tapes 3a, 3b are positioned at the same height. The flange 9 of the guide post 12 is controlled to shift in an up-and-down direction in response to the magnetic tape width signal of the cassette detecting switch 13 or the beginning edge detector 14a, or the ending edge detector 14b so that even the narrow magnetic tape 3a can travel at the predetermined height.

Furthermore, by changing the inclined angle and/or the inclined direction of the movable post 10, a downward torsion force is applied to the narrow magnetic tape 3a so that the narrow magnetic tape can travel stably without fluctuating in the up-and-down direction. As shown in FIG. 7, an actuator 160 inclines the movable post 10 to move from a dotted-line position to a solid-line position along an arrow A. By this inclination, a tension of the magnetic tape 3a increases at an upper side thereof. Thus, a component of force B acting downward is generated and the magnetic tape 3a is urged downward by this force B. Thus, the magnetic tape 3a is fixed at the lowest position and can travel stably without causing fluctuation in the up-and-down direction. In this case, the recording/reproducing operation is carried out by using only the magnetic head 5a on the guide drum. In this fashion, magnetic heads to be used are selected in accordance with the magnetic tape width detected by the cassette detecting switch 13 or the beginning edge/ending edge detectors 14a, 14b.

Though the above embodiment uses the cassette whose thickness corresponds to the width of the magnetic tape accommodating therein, this invention is similarly applied to the cassette whose thickness is different from the width of the magnetic tape accommodated therein. Furthermore, even if the height of the lower edge of the magnetic tape is differently set with respect to the same cassette, this invention can be achieved in the same manner because the height of the cassette positioning boss 15 is controlled by an appropriate actuator, generally shown by a reference numeral 150 in FIG. 1. The actuator 150 may be a conventional drive mechanism using a motor or a solenoid.

More specifically, the cassette detecting switch 13 or the beginning/ending edge detectors 14a, 14b can detect information relating both the tape width and the cassette kind. If these two types of information are known, the actuator 150 can adjust the height of the cassette positioning boss 15 so that the lower edge of the magnetic tape is always positioned at a predetermined height regardless of the cassette type.

Moreover, in the above embodiment, an actuator for shifting the flange in the up-and-down direction is provided at an entry side of the guide drum and an inclined movable post is provided at an exit side of the guide drum, the present invention does not limit the positions, numbers, types of the actuators to the disclosed ones in the above embodiment. For example, it is preferable to constitute the actuator to shift the flange of the exit side post, in the up-and-down direction. Or, it can be removed in certain circumstances. Furthermore, the inclined movable post can be constructed to apply downward torsion force to the magnetic tapes 3a, 3b all the time by merely changing the inclination angle in advance, Though above example shows the magnetic tape travelling height being positioned by taking a lower edge of the magnetic tape as a standard, it is also preferable to take an upper edge of the magnetic tape as a standard instead of the lower edge, In such a case, it would be desirable to adopt a cassette which has the same upper height of the magnetic tape in the cassette.

Furthermore, though the above embodiment is explained about a magnetic tape recording/reproducing apparatus of a rotary head type, this embodiment can obtain a similar function and an effect even if it is applied to another magnetic tape apparatus such as a general audio cassette tape recorder of a stationary head type.

Second embodiment

Figure 3:
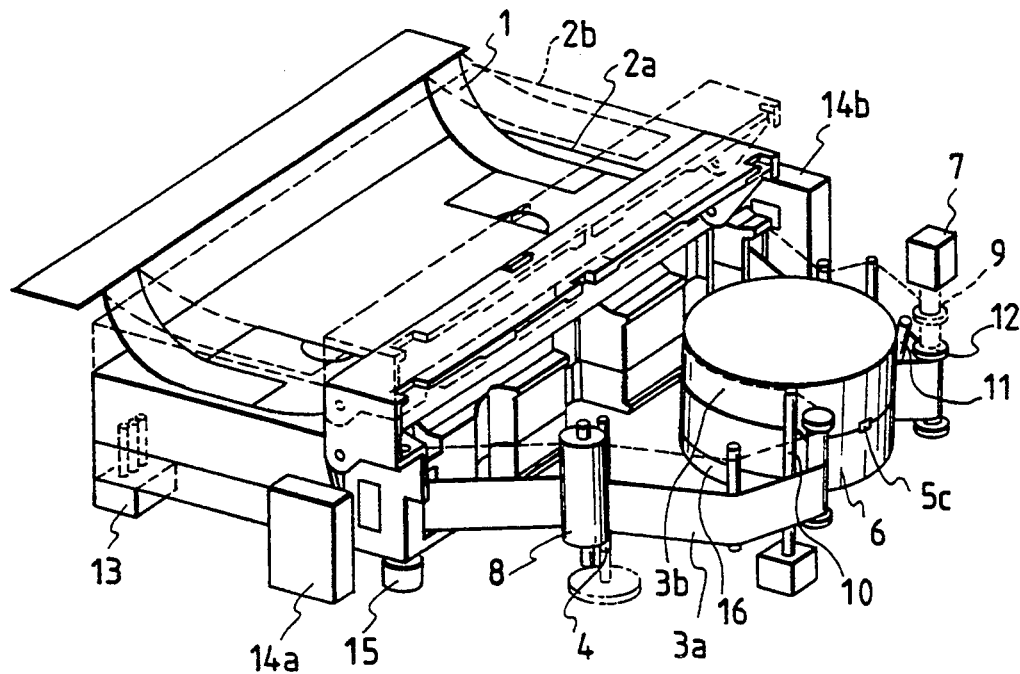
FIG. 3 is a perspective view showing the magnetic tape recording/reproducing apparatus in accordance with the second embodiment of the present invention.
Figure 4:
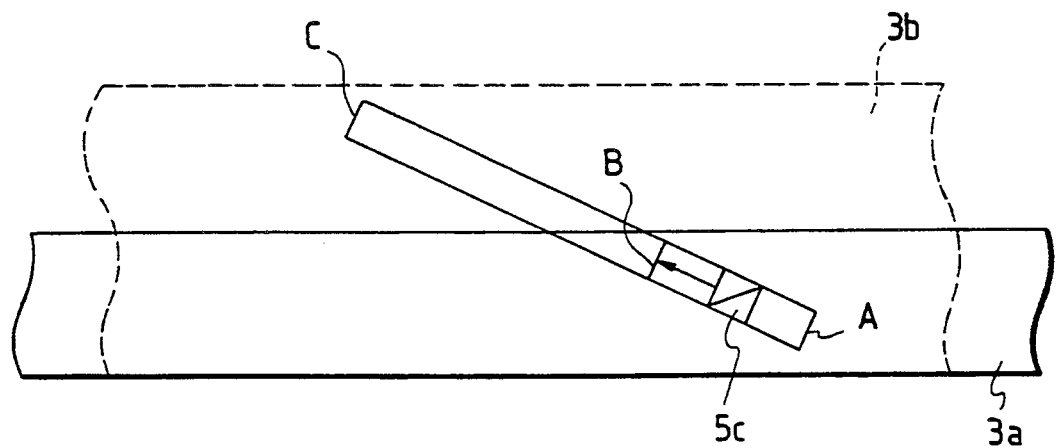
FIG. 4 is a diagram showing a scanning trace line of the magnetic head in the second embodiment of the present invention.

FIG. 3 is a perspective view showing a second embodiment of the present invention wherein the guide drum 6 is provided a single magnetic head 5c thereon. The explanation of the same components as the previous example is omitted here. Further, as well as the first embodiment, the magnetic head 5c in this embodiment can be any one of a recording only type magnetic head, a reproducing only type magnetic head, or a compatible type magnetic head compatible for both the recording/reproducing operations, and also can be an erasing magnetic head. FIG. 4 is a diagram showing a scanning trace line by this magnetic head. In this case, the wide magnetic tape 3b is wound around the guide drum 6 in such a manner that the single magnetic head 5c can scan all the effective range of the magnetic tape 3b.

Even in the case that the thin cassette 2a is loaded, though the narrow magnetic tape 3a is wound by the same amount as the wide magnetic tape 3b, the magnetic head 5c contacts with the magnetic tape 3a within a region from a point A to a winding intermediate point B, as shown in FIG. 4. An operation range of the magnetic head 5c is determined in accordance with a magnetic tape width detected by the cassette detecting switch 13 or the beginning and the ending edge detectors 14a, 14b. Namely, a gate is controlled to activate the magnetic head 5c from the point A to the point B in FIG. 4 with respect to the narrow magnetic tape 3a. To the contrary, the magnetic head 5c is activated from the point A to the point C in FIG. 4 with respect to the wide magnetic tape 3b to carry out the recording/reproducing operations. More specifically, the head scanning operation is carried out by the well-known helical scanning method. Accordingly, the magnetic type 3a is wound around the cylinder 6 obliquely. Thus, the magnetic head 5c travels obliquely from the point A to the point B (or to the point C) on the magnetic tape 3a (or the magnetic tape 3b) upon its rotation. The recording track is inclined as shown in FIG. 4.

An operation range of the head is strictly determined according to the tape width detected by the cassette detecting switch 13 or the beginning/ending edge detectors 14a, 14b. In the case of an apparatus exclusively used for reproduction, it is possible to omit the detection of magnetic tape width.

As is described in the foregoing description, in accordance with the present invention, it becomes possible to perform the recording/reproducing operations using different size magnetic tapes, thereby realizing a recording/reproducing apparatus capable of reducing size and increasing capacity and further applicable to future functional diversification.

Moreover, it becomes possible to provide a cassette which makes it easy to adequately position different width magnetic tapes, by equalizing the height from the standard surface defining a cassette height to the upper or the lower edge of the magnetic tape.

Still further, a magnetic head and a magnetic tape in the present invention can be substituted by the combination of an optical head (i.e. an optical pick-up) and an optical tape which are normally applied to compact disc players etc.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to be embraced by the claims.

What is claimed is:

1. A tape drive apparatus selectively driving a plurality of cassettes having different tape widths, comprising:

tape transporting means for feeding a tape at a predetermined speed;

head means for recording signals on and reproducing signals from the tape:

cassette type detecting means for detecting a kind of cassette; and tape positioning means for selectively positioning a tape travelling position in response to an output of the cassette type detecting means.

2. A tape drive apparatus selectively driving a plurality of cassettes having different tape widths, comprising:

tape transporting means for feeding a tape at a predetermined speed;

tape width detecting means for detecting a width of the tape;

head means for recording signals on and reproducing signals from the tape, and head operating section changing means for changing a section of the tape to be scanned by said head means for recording and reproduction in response to an output of the tape width detecting means.

3. A tape drive apparatus in accordance with claim 2 in which said head means is a rotary head accommodated in a guide drum around which the tape is wound, and wherein said head operating section changing means changes an operational section of said rotary head for recording and reproduction on the basis of the output of the tape width detecting means.

4. A tape drive apparatus in accordance with claim 2 in which said head means further comprises a plurality of rotary heads installed on at least one guide drum around which the tape is obliquely wound, and wherein said head operating section changing means selects one or more of said rotary heads in response to the output of the tape width detecting means.

5. A tape apparatus in accordance with claim 4 in which said head means further comprises a plurality of rotary heads aligned in an axial direction of said guide drum, and wherein said head operating section changing means selects one or more of said rotary heads for recording and reproduction in response to the output of tile tape width detecting means.

6. A tape driving apparatus selectively driving a plurality of cassettes having different tape widths, comprising:

tape transporting means for feeding a tape at a predetermined speed;

head means for recording signals on and reproducing signals from the tape;

cassette kind detecting means for detecting a kind of a cassette, said cassette kind detecting means being engageable with a cassette to discriminate what kind cassette is used; and cassette supporting means for supporting a bottom of the cassette, said cassette supporting means including a cassette positioning boss whose height is changeable in accordance with an output of said cassette kind detecting means; and positioning means for shifting said positioning boss in an up-and-down direction.

7. A tape drive apparatus selectively driving a plurality of cassettes having different tape widths, comprising:

cassette holding means for supporting a cassette;

tape transporting means for feeding a tape at a predetermined speed;

head means for recording signals on and reproducing signals from the tape;

tape width detecting means for detecting a width of said tape, said tape width detecting means having a mechanism engageable with the cassette to discriminate what kind of tape width is used; and cassette positioning means for selectively positioning said cassette on the basis of an output signal of the tape width detecting means, said cassette positioning means including an actuator shifting said cassette in a width-wise direction of said cassette.

8. A tape drive apparatus selectively driving a plurality of cassettes having different tape widths, comprising:

tape transporting means for feeding a tape at a predetermined speed, said tape transporting means including a guide post having a flange, said flange guiding an edge of the tape so as to restrict a travelling position of said tape;

head means for recording signals on and reproducing signals from the tape;

tape width detecting means for detecting a width of said tape, said tape width detecting means having a mechanism engageable with a cassette to discriminate what kind of tape width is used; and tape positioning means for selectively positioning the travelling position of said tape on the basis of an output of said tape width detecting means, said tape positioning means including an actuator shifting said flange in an axial direction of said guide post.

* * * * *